US012676793B2

(12) United States Patent
Gautam et al.

(10) Patent No.: US 12,676,793 B2
(45) Date of Patent: *Jul. 7, 2026

(54) METHOD AND APPARATUS FOR EDGE ENABLER SERVER LIFECYCLE MANAGEMENT

(71) Applicant: Samsung Electronics Co., Ltd., Gyeonggi-do (KR)

(72) Inventors: Deepanshu Gautam, Bangalore (IN); Nishant Gupta, Bangalore (IN); Walter Featherstone, Middlesex (GB)

(73) Assignee: Samsung Electronics Co., Ltd (KR)

( * ) Notice: Subject to any disclaimer, the term of this patent is extended or adjusted under 35 U.S.C. 154(b) by 44 days.

This patent is subject to a terminal disclaimer.

(21) Appl. No.: 18/787,545

(22) Filed: Jul. 29, 2024

(65) Prior Publication Data

US 2025/0030595 A1      Jan. 23, 2025

Related U.S. Application Data

(63) Continuation of application No. 18/012,782, filed as application No. PCT/KR2021/008169 on Jun. 29, 2021, now Pat. No. 12,088,459.

(30) Foreign Application Priority Data

Jun. 29, 2020  (IN) .............................. 202041027497
Jun. 23, 2021  (IN) .............................. 202041027497

(51) Int. Cl.
*G06F 15/177* (2006.01)
*H04L 41/0806* (2022.01)
(Continued)

(52) U.S. Cl.
CPC ...... *H04L 41/0806* (2013.01); *H04L 41/0895* (2022.05); *H04W 24/02* (2013.01)

(58) Field of Classification Search
CPC . H04L 41/0806; H04L 41/0895; H04L 41/40; H04L 41/5041; H04W 24/02; H04W 84/042

See application file for complete search history.

(56) References Cited

U.S. PATENT DOCUMENTS 12,068,921 B2 *  8/2024  Gupta ..................... H04L 41/40
12,088,459 B2 *  9/2024  Gautam .............. H04L 41/5041
(Continued)

FOREIGN PATENT DOCUMENTS

CN          109314649        2/2019
DE          102018127383     5/2020
WO      WO 2012/0120450     9/2012

OTHER PUBLICATIONS

PCT/ISA/210 Search Report issued on PCT/KR2021/008169, Oct. 6, 2021, pp. 3.
(Continued)

*Primary Examiner* — John B Walsh
(74) *Attorney, Agent, or Firm* — The Farrell Law Firm, P.C.

(57) ABSTRACT

In embodiments of the present disclosure, a method by a first network node includes transmitting, to a second network node, a request for creating a managed object instance (MOI), the request including one or more requirements related to an edge enabler server (EES), and receiving, from the second network node, a response including information associated with the MOI for an EESfunction information object class (IOC) created based on the one or more requirements included in the request, wherein the created MOI includes one or more attributes indicated in the EESfunction IOC, and wherein the one or more attributes include an identifier of the EES, serving location information for the EES, and information indicating whether the EES supports service continuity.

6 Claims, 4 Drawing Sheets

(51) Int. Cl.
*H04L 41/0895* (2022.01)
*H04W 24/02* (2009.01)

(56) References Cited

U.S. PATENT DOCUMENTS

| | | |
|---|---|---|
| 2019/0266012 A1 | 8/2019 | Chou |
| 2020/0021487 A1 | 1/2020 | Yao et al. |
| 2021/0021494 A1 | 1/2021 | Yao |
| 2023/0047849 A1 | 2/2023 | Ge |

OTHER PUBLICATIONS

PCT/ISA/237 Written Opinion issued on PCT/KR2021/008169, Oct. 6, 2021, pp. 4.

3GPP TS 28.526 Life Cycle Management for mobile networks that include virtualized network functions, (Release 17), Mar. 31, 2022, pp. 39.

3GPP; TSG SA; Architecture for enabling Edge Applications; (Release 17), Jun. 4, 2020, pp. 72.

3GPP; TSG SA; Management and orchestration; Generic management services; (Release 16), Mar. 27, 2020, pp. 239.

3GPP; TSG SA; Management and orchestration; Performance assurance (Release 16), Mar. 27, 2020, pp. 117.

Indian Examination Report dated Jun. 28, 2022 issued on counterpart Application No. IN 202041027497, pp. 6.

Chinese Office Action dated Apr. 22, 2026 issued on counterpart Application No. 202180045905.9, 18 pages.

* cited by examiner

[Fig. 1]

[Fig. 3]
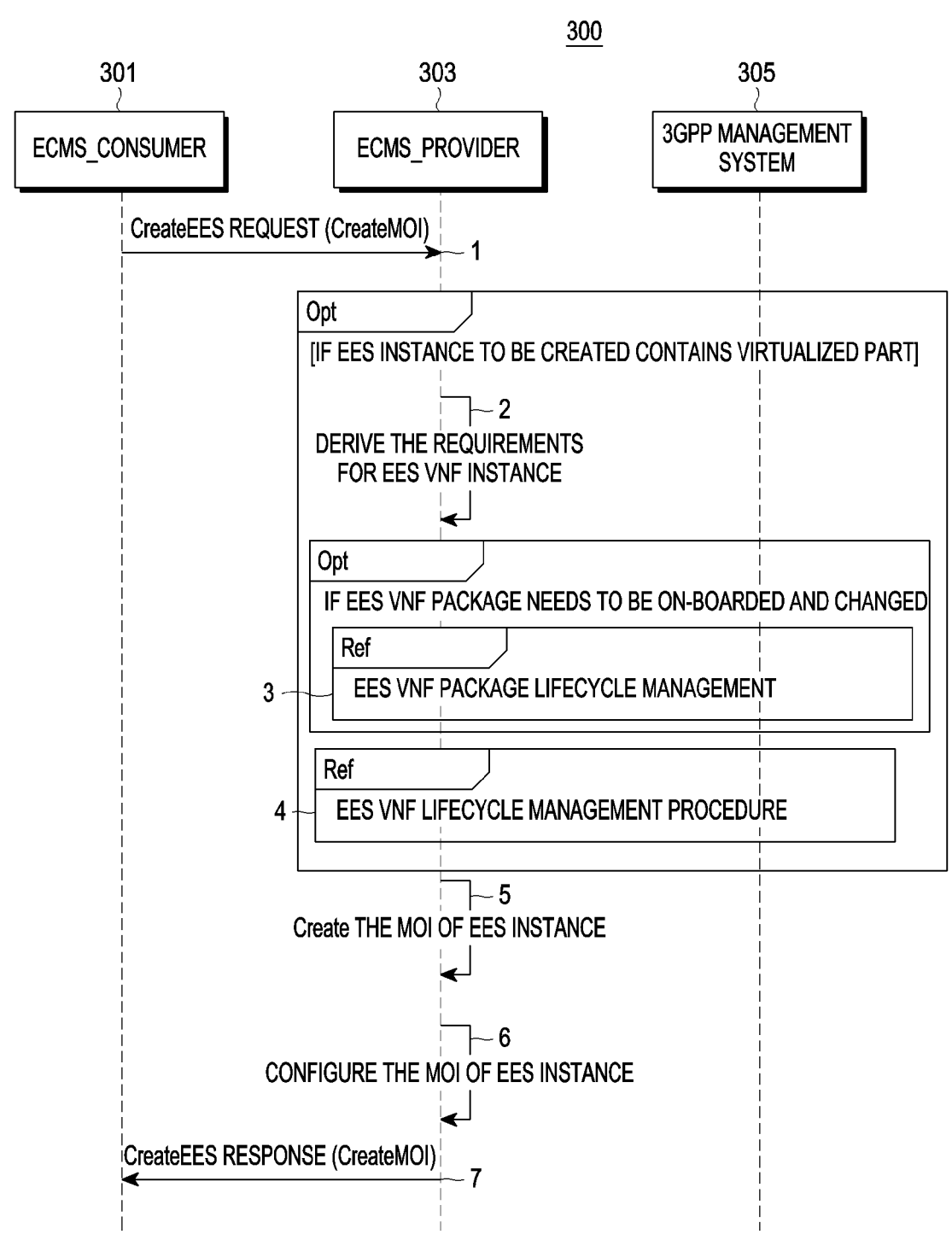

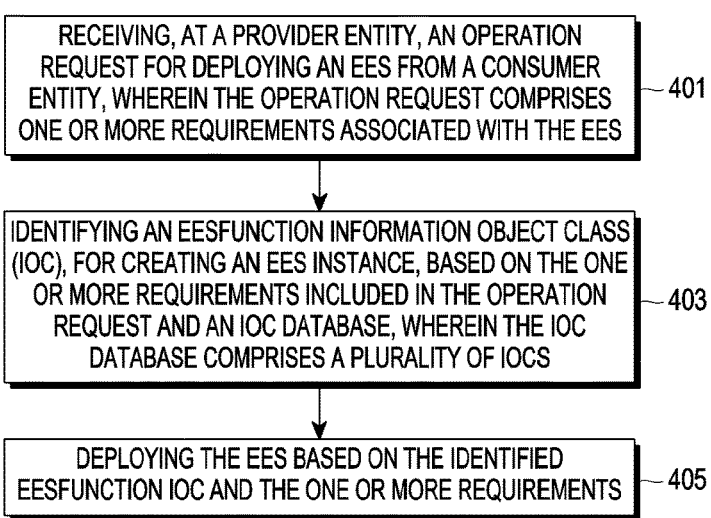

RECEIVING, AT A PROVIDER ENTITY, AN OPERATION REQUEST FOR DEPLOYING AN EES FROM A CONSUMER ENTITY, WHEREIN THE OPERATION REQUEST COMPRISES ONE OR MORE REQUIREMENTS ASSOCIATED WITH THE EES — 401

IDENTIFYING AN EESFUNCTION INFORMATION OBJECT CLASS (IOC), FOR CREATING AN EES INSTANCE, BASED ON THE ONE OR MORE REQUIREMENTS INCLUDED IN THE OPERATION REQUEST AND AN IOC DATABASE, WHEREIN THE IOC DATABASE COMPRISES A PLURALITY OF IOCS — 403

DEPLOYING THE EES BASED ON THE IDENTIFIED EESFUNCTION IOC AND THE ONE OR MORE REQUIREMENTS — 405

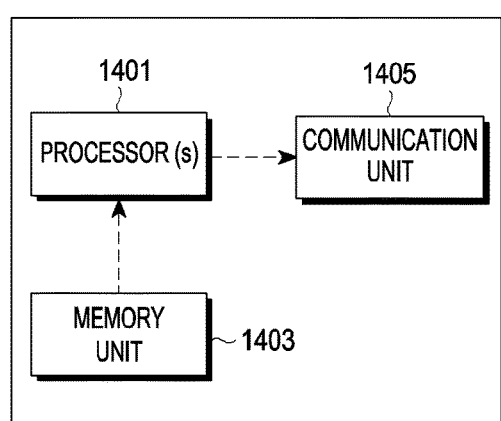

1401

PROCESSOR (s)

1405

COMMUNICATION UNIT

MEMORY UNIT — 1403

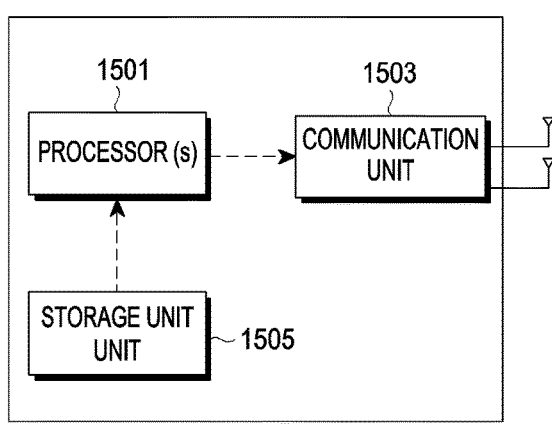

1501

PROCESSOR (s)

1503

COMMUNICATION UNIT

STORAGE UNIT UNIT — 1505

METHOD AND APPARATUS FOR EDGE ENABLER SERVER LIFECYCLE MANAGEMENT

CROSS-REFERENCE TO RELATED APPLICATION(S)

This application is a Continuation application of U.S. application Ser. No. 18/012,782, which was filed in the U.S. Patent and Trademark Office on Dec. 23, 2022, which is a National Phase Entry of PCT International Application No. PCT/KR2021/008169, which was filed on Jun. 29, 2021, and claims priority to Indian Provisional Patent Application No. 20/204,1027497 and Indian Complete patent application Ser. No. 20/204,1027497, which were filed in the Indian Intellectual Property Office on Jun. 29, 2020 and Jun. 23, 2021, respectively, the entire disclosure of each of which is incorporated herein by reference.

TECHNICAL FIELD

The present disclosure relates to a method and apparatus for managing lifecycle of an edge enabler server (EES). In particular, the present disclosure relates to a method and apparatus for deploying the EES.

BACKGROUND ART

FIG. 1 depicts an exemplary implementation details of fifth-generation (5G) wireless communication system. 5G system consists of 5G access network (AN), 5G core network and user equipment (UE). 5G system is expected to be able to provide optimized support for a variety of different communication services, different traffic loads, and different end user communities. For example, the communication services using network slicing may include Vehicle to Everything (V2X) services where the 5G system aims to enhance its capability to meet Key Performance Indicator (KPIs) that emerging V2X applications require. For the advanced applications, the requirements, such as data rate, reliability, latency, communication range and speed, are made more stringent. Further, 5G seamless Enhanced Mobile Broadband (eMBB) is one of the key technologies to enable network slicing, fixed mobile convergence (FMC) which includes wireless-to-the-everything (WTTx) and fibre-to-the-everything (FTTx). The 5G seamless eMBB technology is expected to provide native support for network slicing. For optimization and resource efficiency, the 5G system will select the most appropriate 3rd Generation Partnership Project (3GPP) or non-3GPP access technology for a communication service, potentially allowing multiple access technologies to be used simultaneously for one or more services active on user equipment (UE), massive Internet of Things (IoT) connections. The support for mIoT brings many new requirements in addition to MBB enhancements. Communication services with massive IoT connections such as smart households, smart grid, smart agriculture and smart meter will require the support of a large number and high-density IoT devices to be efficient and cost effective. Operators can use one or more network slice instances to provide these communication services, which require similar network characteristics, to different vertical industries. 3GPP TS 28.530 and 28.531 defines the management of Network Slice in 5G networks. It also defined the concept of Communication Services, which are provided using one or multiple Network Slice. A Network Slice Instance (NSI)

may support multiple Communication Service Instances (CSI). Similarly, a CSI may utilize multiple NSIs.

Further, 3GPP SA6 is working on an architecture for enabling edge computing (3GPP TS 23.558), which specifies an application framework or an enabling layer platform to support Edge Computing in 3GPP specified networks, (e.g. discovery of edge services, authentication of the clients). The work includes the interactions between the UE and the enabling layer platform, and the interactions between the applications deployed over edge and the enabling layer platform. Further, the work is to facilitate integration with the underlying 3GPP core network. The work defines Edge Application Server (EAS) or Edge Application as a piece of software running and deployed on virtual infrastructure at the edge of the 3GPP network.

DISCLOSURE OF INVENTION

Technical Problem

However, the lifecycle management of edge components is considered to be a crucial management aspect. The present disclosure therefore solves one or more problem prevalent in the conventional art.

Solution to Problem

The technical solution is provided to introduce a selection of concepts, in a simplified format, that are further described in the detailed description of the disclosure. The technical solution is neither intended to identify key or essential inventive concepts of the disclosure and nor is it intended for determining the scope of the disclosure.

In embodiments of the present disclosure, a method and apparatus for managing the lifecycle of EES are disclosed. SA6 has defined EES and EES is a 3GPP network function deployed on the operators EDN (on the edge, i.e. very close to 3GPP equipment) being managed by the operator's management system. The lifecycle management of edge components and the lifecycle of EES, as 3GPP network function are managed which includes instantiation, termination, scaling, etc. Thus, 3GPP management system have the capability to provide EES lifecycle management including but not limited to instantiation, termination, scaling.

Further, the embodiments of the present disclosure manage the Lifecycle of the Edge components as defined in SA6, specifically the EES (with its registered EAS(s) whilst accounting for their associated requirements.

The present disclosure discloses a method and apparatus for deploying an edge enabler server (EES). The method comprising receiving, at a provider entity, an operation request for deploying an EES from a consumer entity, wherein the operation request comprises one or more requirements associated with the EES. Thereafter, identifying an EESfunction information object class (IOC), for creating an EES instance, based on the one or more requirements included in the operation request and an IOC database, wherein the IOC database comprises a plurality of IOCs and deploying the EES based on the identified EES-function IOC and the one or more requirements.

The present disclosure discloses a method for deploying an edge enabler server (EES). The method comprising receiving, from a second network node, a request for creating a managed object instance (MOI), the request including one or more requirements related to an edge enabler server (EES); creating the MOI for an EESfunction information object class (IOC) based on the one or more requirements included in the request; and configuring the created MOI including one or more attributes indicated in the EESfunction IOC.

The present disclosure discloses a first network node for deploying an edge enabler server (EES). The first network node comprising a transceiver; and at least one processor coupled to the transceiver, wherein the at least one processor is configured to: control the transceiver to receive, from a second network node, a request for creating a managed object instance (MOI), the request including one or more requirements related to an edge enabler server (EES), create the MOI for an EESfunction information object class (IOC) based on the one or more requirements included in the request, and configure the created MOI including one or more attributes indicated in the EESfunction IOC.

To further clarify the advantages and features of the present disclosure, a more particular description of the disclosure will be rendered by reference to specific embodiments thereof, which is illustrated in the appended drawings. It is appreciated that these drawings depict only typical embodiments of the disclosure and are therefore not to be considered limiting of its scope. The disclosure will be described and explained with additional specificity and detail with the accompanying drawings.

BRIEF DESCRIPTION OF DRAWINGS

These and other features, aspects, and advantages of the present disclosure will become better understood when the following detailed description is read with reference to the accompanying drawings in which like characters represent like parts throughout the drawings, wherein:

FIG. 3 illustrates a call flow diagram representing the procedures to deploy EES on a particular Edge Data Network (EDN), according to an embodiment of the present disclosure.

FIG. 4 illustrates a flow diagram for the deployment of the EES, according to an embodiment of the present disclosure.

FIG. 5 illustrates another exemplary diagram of a network node, according to an embodiment of the present disclosure.

FIG. 6 is a diagram illustrating the configuration of a terminal 1500 in a wireless communication system, according to an embodiment of the present disclosure.

Figure 1:
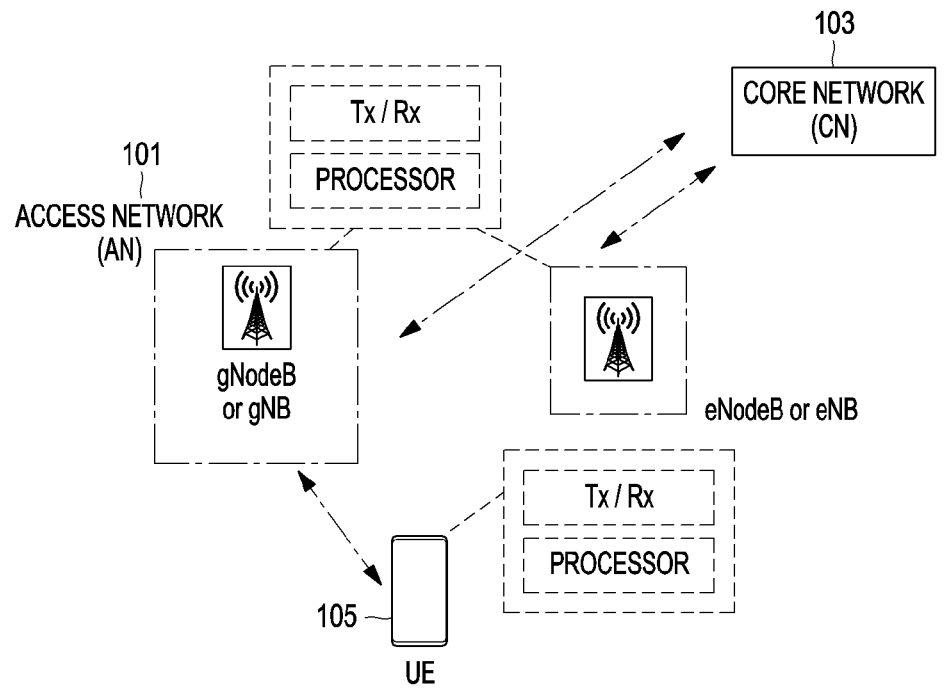
FIG. 1 illustrates an exemplary implementation details of fifth-generation (5G) wireless communication system., according to an embodiment of the present disclosure.

Further, skilled artisans will appreciate that elements in the drawings are illustrated for simplicity and may not have been necessarily been drawn to scale. For example, the flow charts illustrate the method in terms of the most prominent steps involved to help to improve understanding of aspects of the present disclosure. Furthermore, in terms of the construction of the device, one or more components of the device may have been represented in the drawings by conventional symbols, and the drawings may show only those specific details that are pertinent to understanding the embodiments of the present disclosure so as not to obscure the drawings with details that will be readily apparent to those of ordinary skill in the art having benefit of the description herein.

MODE FOR THE INVENTION

For the purpose of promoting an understanding of the principles of the disclosure, reference will now be made to the embodiment illustrated in the drawings and specific language will be used to describe the same. It will nevertheless be understood that no limitation of the scope of the disclosure is thereby intended, such alterations and further modifications in the illustrated system, and such further applications of the principles of the disclosure as illustrated therein being contemplated as would normally occur to one skilled in the art to which the disclosure relates.

It will be understood by those skilled in the art that the foregoing general description and the following detailed description are explanatory of the disclosure and are not intended to be restrictive thereof.

Reference throughout this specification to "an aspect", "another aspect" or similar language means that a particular feature, structure, or characteristic described in connection with the embodiment is included in at least one embodiment of the present disclosure. Thus, appearances of the phrase "in an embodiment", "in another embodiment" and similar language throughout this specification may, but do not necessarily, all refer to the same embodiments.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skilled in the art to which this disclosure belongs. The system, methods, and examples provided herein are illustrative only and not intended to be limiting.

The present disclosure provides a method and apparatus for edge enabler server (EES) lifecycle management in wireless communication systems for deploying the EES. In particular, an EES instance object class (IOC) is provided in an EDGE network resource model (NRM) as an EESFunction IOC. This IOC represents the properties of a EES. This IOC includes attributes inherited from SubNetwork IOC (as defined in TS 28.622 [30]). The various attributes are defined in below Table 1:

TABLE 1

| Attribute name | Support Qualifier | Description |
|---|---|---|
| pLMNIdList | M | As defined in TS 28.541 |
| sNSSAIList | O | As defined in TS 28.541 |
| eESservingLocation | M | This parameter defines the service location for the EES e.g geometric shape covering an area (long, lat, circle, radius); access network defined (e.g. Cell IDs, Tracking Areas); network defined (e.g. a specific EDN(s)), civic address. |
| eESIdentifier | M | The identifier of the EES |
| eESEndPoint | M | Endpoint information (e.g. URI, FQDN, IP address) used to communicate with the EES. This information is provided to the EEC to connect to the EES. |
| eESProvider | O | EAS provider |
| eESCapabilityExpo | M | Describing the EES capabilities |

TABLE 1-continued

| Attribute name | Support Qualifier | Description |
|---|---|---|
| | | exposed to be consumed by EAS. |
| eESRegistrationInfo | M | |
| >regExpiration | O | Expiration time for the registration |
| >secCredential | O | Security credentials resulting from a successful authorization for the edge computing service. |
| serviceContinuitySupport | | This parameter defines whether the EES supports service continuity. |
| Attribute related to role | | |
| EASFunctionref | M | Defining the EAS(s) which this EES is serving. |

Figure 2:
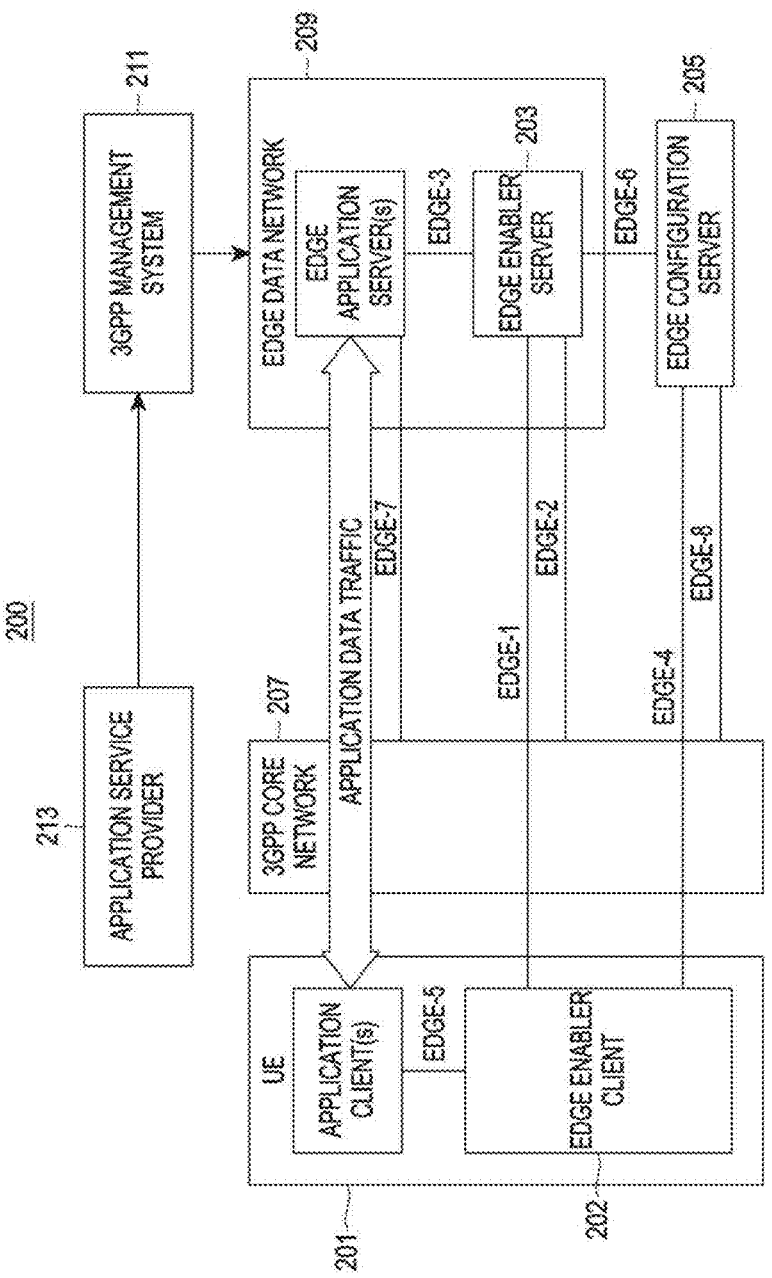
FIG. 2 illustrates a block diagram Application Architecture for Edge Apps (EDGEAPP) for enabling edge computing and 3GPP Management System managing the lifecycle of EES, according to an embodiment of the present disclosure.

FIG. 2 illustrates a block diagram for an exemplary implementation details of application architecture for edge apps (EDGEAPP) 200 for enabling edge computing and 3GPP Management System managing the lifecycle of EES, according to an embodiment of the present disclosure. In general, 3GPP SA6 is working on an architecture for enabling edge computing (3GPP TR 23.558), which specifies an application framework or an enabling layer platform to support Edge Computing in 3GPP specified networks, which includes but not limited to discovery of edge services, authentication of the clients, etc. EES 203 is a 3GPP network function deployed on the operators EDN 209 (on the edge, i.e. very close to 3GPP equipment) being managed by the operator's management system. Further, there is interaction between the UE 201 and the enabling layer platform. Further, there is interaction between the applications deployed over edge and the enabling layer platform. Further, the integration with the underlying 3GPP core network is facilitated. Furthermore, EAS 209 or Edge Application is defines as a piece of software running and deployed on virtual infrastructure at the edge of the 3GPP network. According to said embodiment, there is 3GPP Management System for managing the lifecycle of EES 203. The 3GPP management system have the capability to provide EES lifecycle management including but not limited to instantiation, termination, scaling.

FIG. 3 illustrates a call flow diagram representing the procedures to deploy EES on a particular edge data network (EDN), according to an embodiment of the present disclosure. The mechanism 300 shown in the FIG. 3 may be implemented in the edge apps (EDGEAPP) 200 as shown in the FIG. 2. The mechanism for deployment of the EES has following steps:

At Step 1: The edge computing management service provider (ECMS_P) 303 receives a request (this will use createMOI operation defined in 3GPP TS 28.532) from edge computing management service consumer (ECMS_C) 301 with EES related requirements. The operation createMOI is to create a managed object instance (MOI) in the management information base (MIB) maintained by the service provider.

The EES related requirements which are provided with the request as part of attributeListIn parameter of createMOI operation includes EDNidentifier and EASIdentifiers. In an example, the EDNidentifier identifies the host EDN to instantiate the EES on. Further, in an example, EASIdentifiers identifies the list of EAS registered with the EES.

The above EES requirements will be defined as attributes of EESFunction information object class (IOC) on which the createMOI operation would act and further as shown in the Table 1. The IOC will be defined as part of 5G network resource model (NRM) in 3GPP TS 28.541.

At Step 2: If EES instance to be created contains virtualized part, ECMS_P derives the requirements for EES virtual network function (VNF) instance based on the EES network function related requirements.

At Step 3: If corresponding EES VNF Package needs to be on-boarded or changed, the network function management service provider (NFMS_P) invoke corresponding VNF Package management procedure as described in clause 4.3 in TS 28.526.

At Step 4: The NFMS_P invokes VNF lifecycle management with requirements for EES VNF instance as described in clause 4.2.2.2 in TS 28.526.

At Step 5: The ECMS_P creates the MOI for EESFunction class. The MOI shall contain attributes as defined in EESFunction IOC.

At Step 6: The ECMS_P configures the new created MOI with corresponding configuration information as per the information model definition for Edge NRM 3GPP TS 28.541.

Finally at Step 7: The ECMS_P sends the CreateEES response (this will use createMOI operation defined in 3GPP TS 28.532) to ECMS_C with identifier of MOI and with identifier of ECMS_P which actually maintains the MOI for EES instance.

FIG. 4 illustrates a flow diagram for the deployment of the EES, according to an embodiment of the present disclosure. The deployment of the EES 203 may be implemented in the EDGEAPP 200 for enabling edge computing as shown in FIG. 2 and FIG. 3 as disclosed above. Further, for the sake of simplicity some the explanation as applicable has been omitted herein. Further for the ease of explanation same reference numerals has been used in the forthcoming paragraphs. The method 400 includes the following steps.

At block 401, the method 400 initially, receives, at a provider entity, an operation request for deploying an EES from a consumer entity. The operation request comprises one or more requirements associated with the EES. In an implementation the operation request is a create MOI request. In an implementation, the one or more requirements includes at least one of an EDNidentifier that identifies a host edge data network (EDN) on which the EES is to be instantiated and a EAS identifier that identifies a list of edge application servers (EASs) registered with the EES. Further, as an example, alternatively, the provider entity or an ECMS_P 303 referred to an edge computing management service provider (ECMSP) 303 and consumer entity or an ECMS_C 301 referred to ECMS consumer. The mechanism at the block 401 corresponds to the mechanism as explained in the step 1 of the FIG. 3.

Thereafter, at block 403, the method 400 further, identifies an EESfunction information object class (IOC), for creating an EES instance, based on the one or more requirements included in the operation request and an IOC database. The IOC database comprises a plurality of IOCs.

After, identifying the EESfunction IOC, the method 400 performs obtaining a plurality of attributes a plurality of attributes associated with the identified EESfunction IOC from the IOC database. The plurality of attributes including at least one of a pLMNIdList, a sNSSAIList, an endpoint information used to communicate with the EES, an information of EES provider, an expiration time of the registration, and EASfunction reference. The plurality of the attributes in defined in 3GPP TS 28.541.

As a further implementation, the method 400 performs determining if the EES instance to be created contains a virtualized part. This determination is performed by deriving the requirements for EES VNF instance. This step corresponds to step 2 of the FIG. 3. Thereafter, determining if a VNF instance, of the corresponding virtualized part, is required to be one of on-boarding or updated. Based on the determination a VNF Package management for the corresponding VNF instance is being invoked. This step corresponds to step 3 of the FIG. 3. Thereafter, the method 400 performs invoking a VNF lifecycle management with the determined requirement for the VNF instance for the EES instance. This step corresponds to step 4 of the FIG. 3.

In yet further implementation, the method 400, creates a managed object instance (MOI) for the identified EESfunction IOC based on the obtained plurality of attributes. In an embodiment the MOI corresponds to the EES instance. This step corresponds to step 5 of the FIG. 3. In particular, the method 400, performs replacing a value of the one or more attributes associated with the EESfunction IOC based on the one or more requirements included in the operation request, during creation of the MOI. Now, during the creation of EESFunction, the value of attributes present in EESFunction IOC received in the instantiation request. If the same value exists in the Class then it will be replaced with the value received in the request. Thereby, configuring the new created MOI with corresponding configuration information as per the information model definition for Edge NRM 3GPP TS 28.541 as explained in the step 6 of the FIG. 3.

Thereafter, at block 405, the method 400, deploys the EES based on the identified EESfunction IOC and the one or more requirements. This step is based on the steps 5-6 of the FIG. 3.

After creating and configuring the MOI of the EES instance, the method 400, performs transmitting an operation request response, to the consumer entity, along with an identifier associated with the MOI and another identifier associated with the ECSMP that maintains the MOI for the EES instance in response to the deployment of the EES. As an example, the operation request response is a createEES. This step corresponds to step 7 of the FIG. 3.

In view of the aforesaid, there are provided various advantageous features relating to the present disclosure:

Thus, the embodiments of the present disclosure manage the Lifecycle of the Edge components as defined in SA6, specifically the EES (with its registered EAS(s) whilst accounting for their associated requirements.

The 3GPP management system have the capability to provide EES lifecycle management including (not limited to) instantiation, termination, scaling.

FIG. 5 illustrates another exemplary diagram of a network node. The network node 1400 may include a communication unit 1405 (e.g., communicator or communication interface), a memory unit 1403 (e.g., storage), and at least one processor 1401. Further, the network node 1400 may also include the cloud-RAN (C-RAN), a central unit (CU), a core network (NW), a distributed unit (DU) or the any other possible network (NW) entities like provider entity or consumer entity. The communication unit 1405 may perform functions for transmitting and receiving signals via a wireless channel.

In an example, the processor 1401 may be a single processing unit or a number of units, all of which could include multiple computing units. The processor 1401 may be implemented as one or more microprocessors, microcomputers, microcontrollers, digital signal processors, central processing units, state machines, logic circuitries, and/or any devices that manipulate signals based on operational instructions. Among other capabilities, the processor 1401 is configured to fetch and execute computer-readable instructions and data stored in the memory. The processor may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The one or a plurality of processors control the processing of the input data in accordance with a predefined operating rule or artificial intelligence (AI) model stored in the non-volatile memory and the volatile memory. The predefined operating rule or artificial intelligence model is provided through training or learning.

The memory may include any non-transitory computer-readable medium known in the art including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes.

FIG. 6 is a diagram illustrating the configuration of a terminal 1500 in a wireless communication system according to an embodiment of the present disclosure. The configuration of FIG. 15 may be understood as a part of the configuration of the terminal 1500. Hereinafter, it is understood that terms including "unit" or "module" at the end may refer to the unit for processing at least one function or operation and may be implemented in hardware, software, or a combination of hardware and software.

Referring to FIG. 6, the terminal 1500 may include a communication unit 1503 (e.g., communicator or communication interface), a storage unit 1505 (e.g., storage), and at least one processor 1501. By way of example, the terminal 1500 may be a User Equipment, such as a cellular phone or other device that communicates over a plurality of cellular networks (such as a 3G, 4G, a 5G or pre-5G network or any future wireless communication network).

The communication unit 1503 may perform functions for transmitting and receiving signals via a wireless channel.

While specific language has been used to describe the present subject matter, any limitations arising on account thereto, are not intended. As would be apparent to a person in the art, various working modifications may be made to the method in order to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

The invention claimed is:

1. A method by a first network node, the method comprising:

transmitting, to a second network node, a request for creating a managed object instance (MOI), the request including one or more requirements related to an edge enabler server (EES); and receiving, from the second network node, a response including information associated with the MOI for an EESfunction information object class (IOC) created based on the one or more requirements included in the request, wherein the created MOI contains one or more attributes as defined in the EESfunction IOC, and wherein the one or more attributes include an identifier of the EES, serving location information for the EES, and information indicating whether the EES supports service continuity.

2. The method of claim 1, wherein the one or more requirements include at least one of an edge data network (EDN) identifier that identifies a host EDN to instantiate the EES and an edge application server (EAS) identifier that identifies a list of EASs registered with the EES.

3. The method of claim 1, wherein the first network node is a service consumer device and the second network node is a service provider device.

4. A first network node, the first network node comprising:

a transceiver; and at least one processor coupled to the transceiver, wherein the at least one processor is configured to:

control the transceiver to transmit, to a second network node, a request for creating a managed object instance (MOI), the request including one or more requirements related to an edge enabler server (EES), and receive, from the second network node, a response including information associated with the MOI for an EES-function information object class (IOC) created based on the one or more requirements included in the request, wherein the created MOI contains one or more attributes as defined in the EESfunction IOC, and wherein the one or more attributes include an identifier of the EES, serving location information for the EES, and information indicating whether the EES supports service continuity.

5. The first network node of claim 4, wherein the one or more requirements include at least one of an edge data network (EDN) identifier that identifies a host EDN to instantiate the EES and an edge application server (EAS) identifier that identifies a list of EASs registered with the EES.

6. The first network node of claim 4, wherein the first network node is a service consumer device and the second network node is a service provider device.

* * * * *